(12) United States Patent
Ogasawara

(10) Patent No.: US 7,418,112 B2
(45) Date of Patent: Aug. 26, 2008

(54) PEDESTRIAN DETECTION APPARATUS

(75) Inventor: Toyokazu Ogasawara, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 570 days.

(21) Appl. No.: 11/031,742

(22) Filed: Jan. 7, 2005

(65) Prior Publication Data
US 2005/0157929 A1   Jul. 21, 2005

(30) Foreign Application Priority Data
Jan. 8, 2004   (JP)   ............... 2004-003483

(51) Int. Cl.
*G06K 9/00*   (2006.01)
(52) U.S. Cl. ............ 382/103; 348/143; 382/104; 382/199; 382/203; 382/217
(58) Field of Classification Search ........ 348/345, 348/143; 382/103, 104, 181, 203, 199, 217
See application file for complete search history.

(56) References Cited

U.S. PATENT DOCUMENTS

| | | | | |
|---|---|---|---|---|
| 5,243,418 | A * | 9/1993 | Kuno et al. | 348/155 |
| 6,931,596 | B2 * | 8/2005 | Gutta et al. | 715/728 |
| 7,130,448 | B2 * | 10/2006 | Nagaoka et al. | 382/104 |
| 7,239,718 | B2 * | 7/2007 | Park et al. | 382/103 |
| 7,305,106 | B2 * | 12/2007 | Sumitomo et al. | 382/103 |
| 2003/0138133 | A1 | 7/2003 | Nagaoka et al. | |
| 2003/0156216 | A1 * | 8/2003 | Nonaka | 348/345 |
| 2004/0120581 | A1 * | 6/2004 | Ozer et al. | 382/224 |
| 2004/0153229 | A1 * | 8/2004 | Gokturk et al. | 701/45 |
| 2005/0157929 | A1 * | 7/2005 | Ogasawara | 382/181 |
| 2006/0177097 | A1 * | 8/2006 | Fujimura et al. | 382/103 |

FOREIGN PATENT DOCUMENTS

| | | |
|---|---|---|
| DE | 10325762 | 12/2004 |
| JP | 05-189570 | 7/1993 |
| JP | 10-105891 | 4/1998 |
| JP | 2002-024986 | 1/2002 |

OTHER PUBLICATIONS

Haritaoglu I, et al.; "W4: Real-Time Surveillance of People and Their Activities", IWWW Transactions on Pattern Analysis and Machine Intelligence, IEEE Service Center, Los Alamitos, CA, US, vol. 22, No. 8, Aug. 2000, pp. 809-830, XP000976488, ISSN:0162-8828.

(Continued)

*Primary Examiner*—Gregory M Desire
(74) *Attorney, Agent, or Firm*—Smith, Gambrell & Russell (57) ABSTRACT

A pedestrian detection apparatus of the present invention extracts a whole-body region and a prospective head region based on a pattern matching between an input image picked up by an infrared camera and whole-body/head model images stored in a model-image storage unit. If the whole-body region has not been recognized, the prospective head region which is at the closest position to a prospective head region recognized from a preceding input image is recognized from the current input image, and an image matching with the head model image of the recognized prospective head region is determined to be a head.

15 Claims, 5 Drawing Sheets

OTHER PUBLICATIONS

Nanda H, et al., "Probabilistic Template Based Pedestrain Detection in Infrared Videos"; Intelligent Vehicle Symposium, 2002. IEEE Jun. 17-21, 2002, Piscataway, NJ, USA, IEEE, vol. 1, Jun. 17, 2002, pp. 15-20, XP010635663 ISBN: 0-7803-7346-4 p. 15, section 2, p. 16, sections 3.1, 3.2.

Yajun Fang et al., "Comparison Between Infrared-Image-Based and Visible-Image-Based Approached for Pedestrain Detection"; Intelligent Vehivles Symposium, 2003. Proceedings. IEEE Jun. 9-11, 2003 Piscataway, NJ USA IEEE, Jun. 9, 2003, pp. 505-510, XP010645929 ISBN:0-7803-7848-2 p. 505, section 1, p. 506, section 2.1, p. 507, section 3.2.

European Search Report for Related Foreign Application Dated Mar. 28, 2006.

* cited by examiner

PEDESTRIAN DETECTION APPARATUS

The disclosure of Japanese Patent Application No. 2004-3483 filed on Jan. 8, 2004; including the specification, drawings, and abstract, is incorporated herein by reference in its entirety.

BACKGROUND OF THE INVENTION

1. Field of the Invention

The present invention relates to a pedestrian detection apparatus for recognizing a pedestrian from an input image picked up by an image pick-up device based on a pattern matching between the input image and an entire profile (or a whole body/part) model images.

2. Description of the Related Art

In a known technique of recognizing a pedestrian on a street, a whole or part of a body of the pedestrian is recognized on the basis of a pattern matching between an image picked up by a camera and model images.

When the whole body of the pedestrian is recognized on the basis of the pattern matching using the model images, a stable recognition accuracy can be obtained. In this method, however, many model images corresponding to motions of the pedestrian are required, and thus an operation processing is complicated and a high-capacity memory must be provided.

On the other hand, in a method of recognizing the pedestrian by using the model image for a part of the body, the recognition accuracy is decreased disadvantageously.

In order to overcome these problems, Japanese Unexamined Patent Application Publication No. 2002-24986 discloses a technique of recognizing the pedestrian based on images of the right and left sides of an object which have been picked up by using visible cameras placed on the right and left. In this known art, the pedestrian is recognized on the basis of a parallax of the right and left cameras, and thus no model image is required.

In the technique disclosed in the above-mentioned patent document, images of an area ahead of a vehicle are picked up by using visible cameras. However, when there is no light source for illuminating the pedestrian, e.g., during the night, an image of sufficient quality can hardly be obtained by the visible camera. On the other hand, a stereo camera has a more complicated entire system compared to a monocular camera and the product cost increases disadvantageously.

As disclosed in Japanese Unexamined Patent Application Publication No. 10-105891, by scanning the area ahead of the vehicle by using a radar sensor, the area can be recognized day and night. However, the circumstances ahead of the vehicle during the night and the state of recognition of the circumstances cannot be visually presented to a driver.

SUMMARY OF THE INVENTION

An object of the present invention is to provide a pedestrian detection apparatus capable of recognizing a pedestrian with a high accuracy by using a small number of model images even in the dark without any light source, while reducing loads of operation processing.

In order to achieve the above-described object, the present invention provides the pedestrian detection apparatus capable of recognizing the pedestrian from an input image picked up by an image pick-up device based on pattern matching between the input image and model images of the pedestrian. The apparatus includes prospective pedestrian recognizing means for recognizing a whole-body region surrounding a whole-body model image and a prospective part region surrounding a part model image of the whole body from the input image based on a pattern matching using the whole-body model image and the part model image of the pedestrian; and pedestrian recognizing means for determining that the recognized prospective part region is part of the pedestrian if the prospective part region exists in the whole-body region recognized by the prospective pedestrian recognizing means.

Preferably, the image pick-up device is one of a far-infrared camera and an infrared camera.

With this configuration, loads of operation processing can be reduced, and the pedestrian can be recognized with a high accuracy by using a small number of model images even in the dark without any light source.

The above and other objects, features, and advantages of the invention will become more clearly understood from the following description referring to the accompanying drawings.

DETAILED DESCRIPTION OF THE PREFERRED EMBODIMENT

Figure 1:
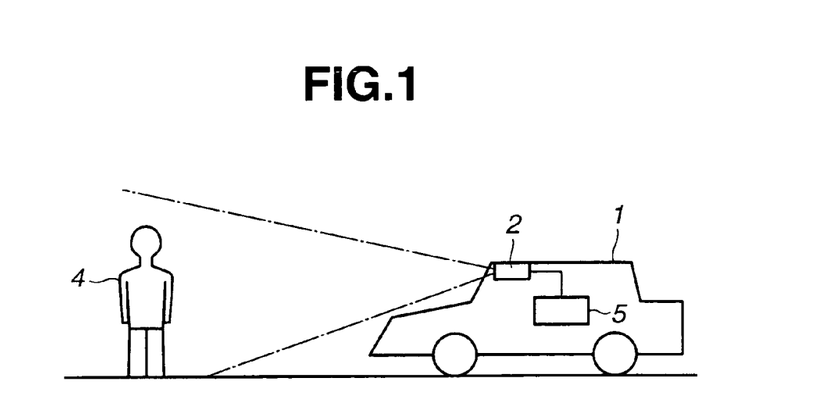
FIG. 1 is a schematic view showing a vehicle equipped with a pedestrian detection apparatus according to the present invention.

Hereinafter, an embodiment of the present invention will be described with reference to the drawings. FIG. 1 is a schematic view showing a vehicle equipped with a pedestrian detection apparatus.

As shown in FIG. 1, a vehicle 1, such as an automobile, adopted in the embodiment is equipped with an infrared camera or far-infrared camera (hereinafter these are collectively referred to as an "infrared camera") 2 serving as an image pick-up device, which picks up an image of an area ahead of or around the vehicle 1; and a pedestrian detection/processing unit 5 for recognizing a pedestrian 4 from an image (hereinafter referred to as an "input image") 3 of the area ahead of or around the vehicle 1 picked up by the infrared camera 2. The infrared camera 2 picks up an image by capturing a small amount of infrared or far-infrared rays, which are electromagnetic waves having a longer wavelength than visible rays, generated by an object even in the dark such as during the night, and converts the image into an image signal so as to output it.

The pedestrian-recognition/processing unit 5 mainly includes a computer, such as a micro computer. The computer includes a central processing unit (CPU) for controlling an entire system according to a control program stored in a read-only memory (ROM), the ROM for storing the control program and fixed data, such as a whole-body model image and a head model image (hereinafter, referred to simply as "whole-body/head model images") of a pedestrian, and a random-access memory (RAM) serving as a temporary storage unit in processing.

Figure 2:
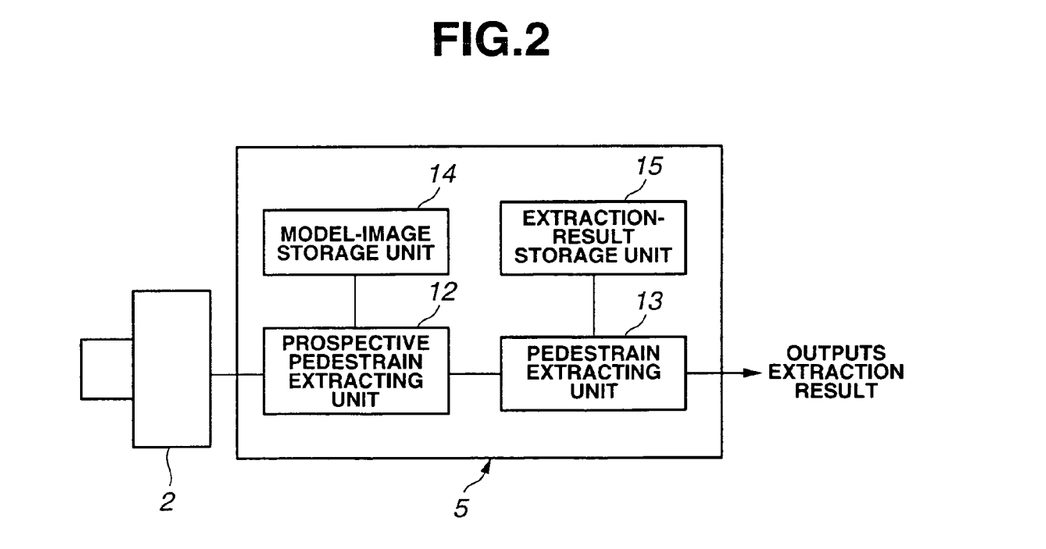
FIG. 2 is a block diagram showing a configuration of a pedestrian recognizing/processing unit.

As shown in FIG. 2, the pedestrian recognition/processing unit 5 includes, as a function for recognizing the pedestrian and processing the data thereof, a prospective pedestrian recognizing unit 12 serving as prospective pedestrian recognizing means; a pedestrian recognizing unit 13 serving as pedestrian-part recognizing means; a model-image storage unit 14 for storing a plurality of whole-body/head model images 6 and 7 used as a reference for recognizing the pedestrian; and an recognition-result storage unit 15.

Figure 4:
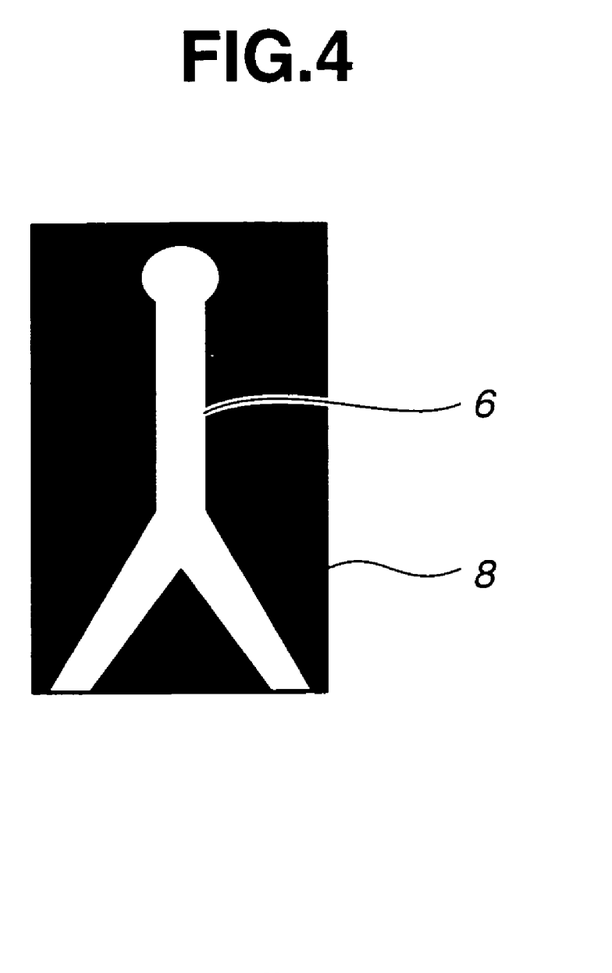
FIG. 4 illustrates a whole-body model image.
Figure 5:
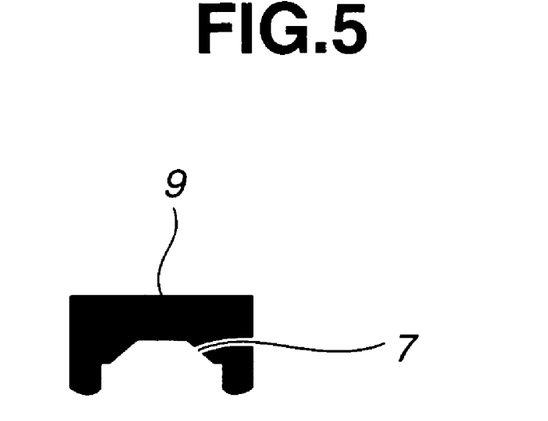
FIG. 5 illustrates a head model image.

FIGS. 4 and 5 show the whole-body model image 6 and the head model image 7 stored in the model-image storage unit 14, respectively. Both model images 6 and 7 are created by patternizing typical shapes of the pedestrian crossing a street viewed from the vehicle side. A plurality of patterns are stored in the model-image storage unit 14.

The prospective pedestrian recognizing unit 12 recognizes a whole-body region 8 and a prospective head region 9 based on a pattern matching between the input image 3 and the whole-body/head model images 6 and 7 stored in the model-image storage unit 14. The pattern matching is a method for evaluating the similarity between a model image and the input image 3, and a correlation coefficient is often used as an evaluation function.

The pedestrian recognition unit 13 removes erroneously recognized components from the whole-body region 8 and the prospective head region 9, which have been recognized by the prospective pedestrian recognizing unit 12, so as to recognized a definitive pedestrian's head. If a head has been recognized from the input image 3, it can be determined that the pedestrian is included in the input image 3.

The recognition-result storage unit 15 stores the recognition result obtained in the pedestrian recognition unit 13.

Figure 3:
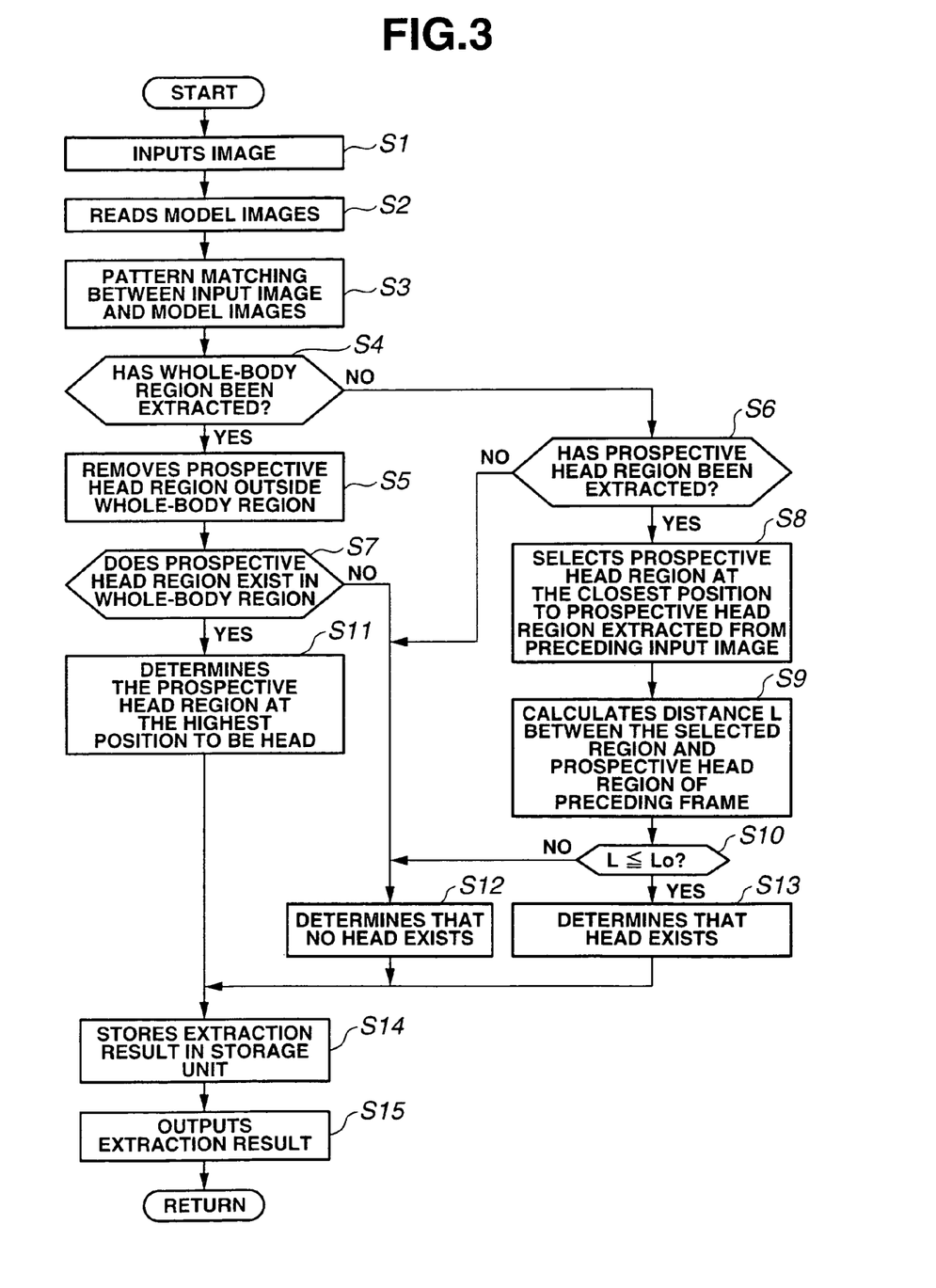
FIG. 3 is a flowchart showing a routine of recognizing the pedestrian.

Specifically, a process of recognizing the pedestrian, which is performed by the pedestrian recognition/processing unit 5, is performed according to a pedestrian recognition routine shown in FIG. 3.

This routine is performed for each frame of the input image 3. First, the image 3 is input in step S1, and the whole-body/head model images 6 and 7 stored in the ROM are read in step S2.

Then, the process proceeds to step S3, where the pattern matching between the input image 3 and the whole-body/head model images 6 and 7 is performed.

Hereinafter, an example of the pattern matching is described. First, a window of a predetermined size for surrounding each of the whole-body/head model images 6 and 7 is shifted in units of pixels to the input image 3 so as to scan the entire image. Each window defines the whole-body region 8 and the prospective head region 9, and the area thereof is the same as that of the whole-body region 8 and the prospective head region 9. Therefore, a reference numeral is not attached to the window.

Then, a degree of the similarity between the input image 3 and the whole-body/head model images 6 and 7 in each window is calculated by a normalized correlation operation. That is, the pattern matching using the normalized correlation is performed. The pattern matching using the normalized correlation is disclosed in Japanese Unexamined Patent Application Publication No. 5-189570, for example.

Figure 6:
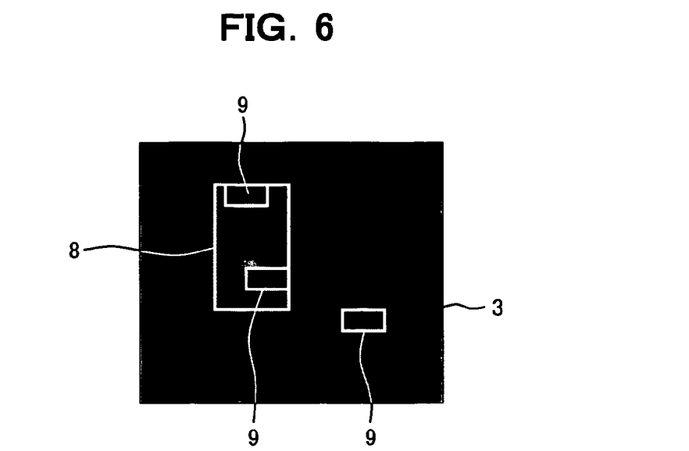
FIG. 6 illustrates a whole-body region and prospective head regions recognized from an input image.

Then, in step S4, it is determined whether or not the whole-body region 8 has been recognized by the pattern matching between the input image 3 and the whole-body model image 6. If the whole-body region 8 has been recognized, the process proceeds to step S5. If the whole-body region 8 has not been recognized, the process proceeds to step S6. FIG. 6 shows the whole-body region 8 which has been recognized by the pattern matching between the input image 3 and the whole-body model image 6 and the prospective head regions 9 which have been recognized by the pattern matching between the input image 3 and the head model image 7.

Hereinafter, a case where the whole-body region 8 has been recognized will be explained first, and then the case where the whole-body region 8 has not been recognized will be explained.

Figure 7:
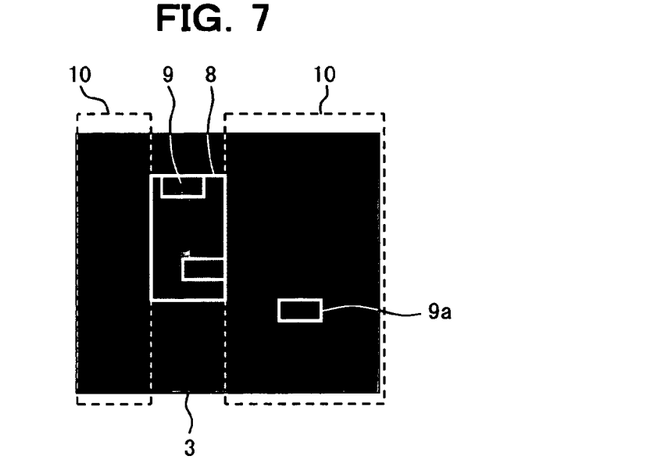
FIG. 7 illustrates a method for recognizing the whole-body region.

In step S5, the prospective head region 9 outside the whole-body region 8 is removed from the input image 3, so as to remove an erroneous recognition factor. As shown in FIG. 7, a prospective head region 9a beside the whole-body region 8 is removed in the embodiment.

Figure 8:
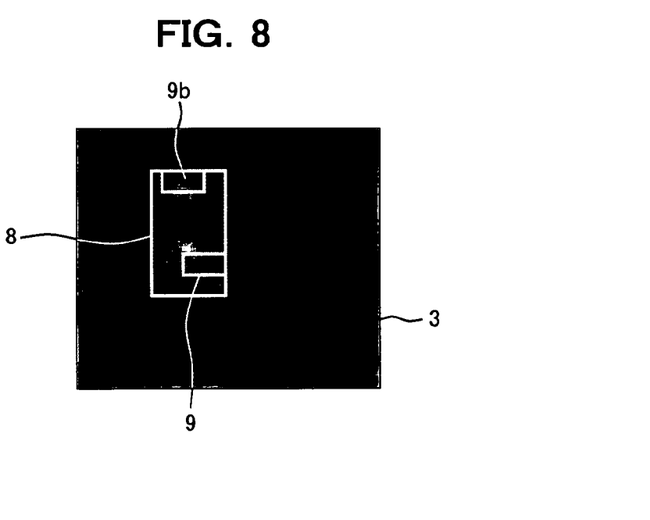
FIG. 8 illustrates the method for recognizing the prospective head regions.

Then, the process proceeds to step S7, where it is determined whether or not any prospective head region 9 exists in the whole-body region 8. If at least one prospective head region 9 exists in the whole-body region 8 (see FIG. 8), the process proceeds to step S11, and otherwise the process proceeds to step S12.

In step S11, an image matching with the head model image 7 of a prospective head region 9b (see FIG. 8) at the highest position among the prospective head regions 9 in the whole-body region 8 is adopted as a head. Accordingly, an erroneous recognition factor of the head can be removed.

Then, the process proceeds to step S14, where the recognition result, that is, an information indicating that a head has been recognized (e.g., head determination flag FLG set to 1 (FLG=1) and coordinates of a specific position (e.g., a center) of the prospective head region 9) is stored in the storage unit such as the RAM. After that, the recognition result is output in step S15 and the routine is completed.

On the other hand, if no prospective head region 9 has been recognized in step S7, the process proceeds to step S12, where it is determined that no head exists. This determination result is set by clearing the head determination flag FLG (FLG=0), for example. Then, the process proceeds to step S14 so as to store the recognition result indicating that no head exists (e.g., FLG=0) in the storage unit such as the RAM. Then, the process proceeds to step S15, where the recognition result is output, and the routine is completed.

Next, the case where the whole-body region 8 cannot be recognized in step S4 will be explained. After the process proceeds from step S4 to step S6, it is determined whether or not any prospective head region 9 exists in the input image 3. If no prospective head region 9 exists, the process jumps to step S12, and otherwise, the process proceeds to step S8.

Figure 9:
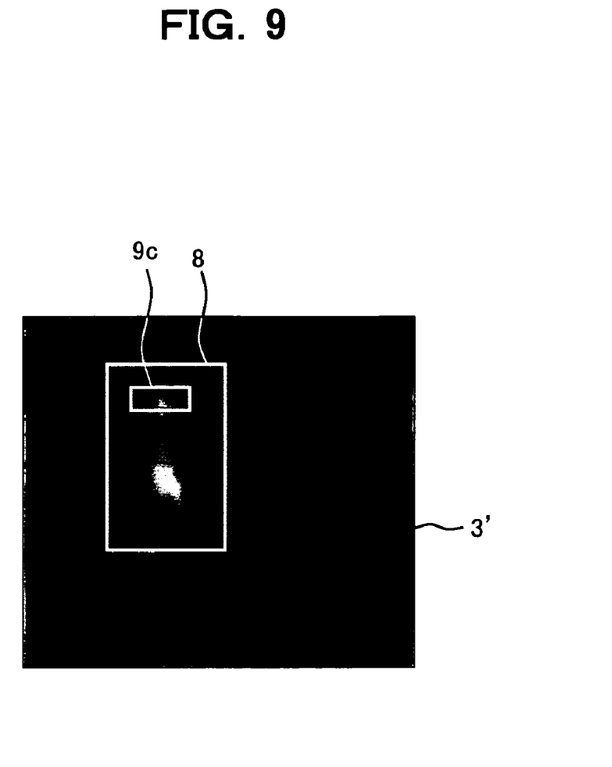
FIG. 9 illustrates a preceding input image.

In step S8, a preceding input image 3' (see FIG. 9) is read, a prospective head region 9c in the input image 3' is compared with the prospective head region(s) 9 recognized from the current input image 3, and then the prospective head region 9 at the closest position to the prospective head region 9c (having the smallest positional difference) is selected. In this case, the whole-body region 8 need not be recognized from the preceding input image 3'.

Incidentally, a distance between the prospective head region 9c in the preceding input image 3' and the prospective head region 9 recognized from the current input image 3 can be calculated in various methods. For example, coordinates of a specific position (e.g., the center) of both prospective head regions 9 may be compared. Although not shown in the flowchart, in step S8, if the prospective head region 9c has not been recognized from the preceding input image 3', the routine ends because an object to be compared does not exist.

Figure 10:
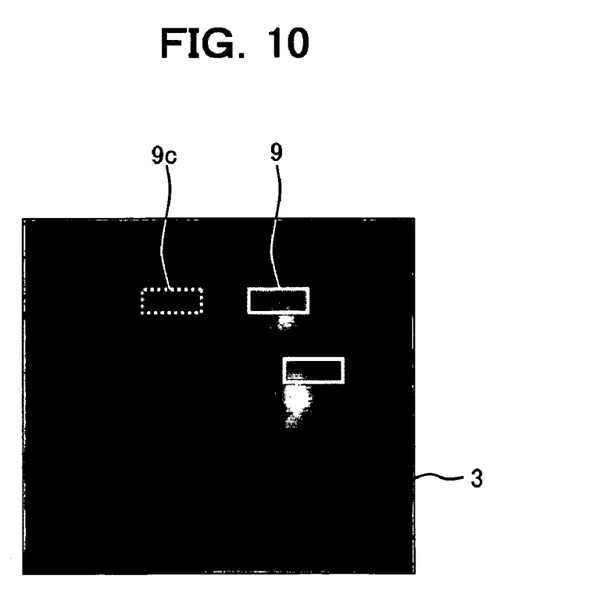
FIG. 10 illustrates a state where a head is to be determined on the basis of the prospective head region recognized from the preceding input image and the prospective head region recognized from the current input image.

Then, the process proceeds to step S9, where a distance L between the detected prospective head region 9 and the prospective head region 9c recognized from the preceding input image 3' is calculated. The distance L may be the distance between the coordinates of the center of the prospective head region 9 and those of the prospective head region 9c.

Then, the process proceeds to step S10, where the distance L is compared with a permissible value Lo which has been set in advance. The permissible value Lo is obtained in an experiment by calculating the distance of a relative movement of the same person between the current input image 3 and the preceding input image 3', and is set at a value of a little positional change.

If the distance L is equal to or smaller than the permissible value Lo (L≦Lo), the process proceeds to step S13, where the image matching with the head model image 7 in the prospective head region 9 is determined to be the head. Then, the process proceeds to step S14, where the information indicating that the head exists (e.g., FLG=1 and the coordinates of a specific position (center) of the prospective head region 9) is stored in the storage unit such as the RAM. Then, the recognition result is output in step S15 and the routine is completed.

As described above, in the embodiment, the whole-body region 8 in the input image 3 is recognized on the basis of the whole-body model image 6, and then a head is recognized from the recognized whole-body region 8 by using the head model image 7. With this method, an erroneous recognition of the pedestrian can be reduced.

Even in the case where the whole-body region 8 cannot be recognized due to obstacles and the like, the pedestrian may be recognized if the prospective head region 9c has been recognized from the preceding input image 3'. In that case, the prospective head region 9c is compared with the prospective head region 9 recognized from the current input image 3. If the positional difference between those regions is small, an image matching with the head model image 7 in the prospective head region 9 can be determined to be a head even if part of the body is hidden. In this way, the accuracy of recognizing the pedestrian can be significantly enhanced.

Likewise, even if the whole-body region 8 cannot be recognized due to the difference between the posture of the pedestrian and the shape of the whole-body model image 6, many whole-body model images of other shapes need not be stored, and the pedestrian can be efficiently recognized with a small number of whole-body model images. As a result, loads of operation processing can be reduced and the pedestrian can be recognized with a high accuracy.

Also, since the pedestrian is recognized on the basis of the input image 3 picked up by the infrared camera 2, the pedestrian can be recognized with the high accuracy even in the dark without any light source.

Further, when a plurality of the prospective head regions 9 exist in the whole-body region 8, the image matching with the head model image 7 in the prospective head region 9b at the highest position is determined to be the head. With this method, the pedestrian can be accurately recognized even if many prospective head regions 9 as factors of erroneous recognition exist.

If the pedestrian has been detected from the input image 3 picked up by the infrared camera 2 provided in the vehicle 1, the vehicle 1 can perform a deceleration control of reducing vehicle speed to a predetermined speed by using a brake or the like, or a warning control of notifying a driver of the existence of the pedestrian by using a lamp, buzzer, or voice from a speaker.

The present invention is not limited to the above-described embodiment. Alternatively, a visible camera can be used instead of an infrared camera as the image pick-up device. Also the infrared camera 2 may be fixed in a street or the like. When the camera is fixed and when the camera is provided in a crosswalk, for example, a traffic light for the vehicle may be automatically switched from green to red via yellow when the pedestrian is detected.

Having described the preferred embodiments of the present invention referring to the accompanying drawings, it should be understood that the present invention is not limited to the precise embodiments and various changes and modifications thereof could be made by one skilled in the art without departing from the spirit or scope of the present invention as defined in the appended claims.

What is claimed is:

1. The pedestrian detection apparatus for recognizing a pedestrian from an input image picked up by image pick-up means based on a pattern matching between the input image and model images of the pedestrian, comprising:

prospective pedestrian recognizing means for recognizing a whole-body region surrounding a whole-body model image and a prospective part region surrounding a part model image of the whole body from the input image based on a pattern matching using the whole-body model image and the part model image of the pedestrian; and pedestrian recognizing means for determining whether or not a recognized prospective part region is a part of the pedestrian if a prospective part region exists in the whole-body region recognized by the prospective pedestrian recognizing means, wherein the part model image is a head model image, and the pedestrian recognizing means determines the prospective part region at the highest position to be a head if a plurality of prospective part regions exist in the whole-body region.

2. The pedestrian detection apparatus according to claim 1, wherein:

the image pick-up means is one of a far-infrared camera and an infrared camera.

3. The pedestrian detection apparatus according to claim 1, wherein:

the image pick-up means is provided in at least one of the vehicle and the street.

4. A pedestrian detection apparatus, for recognizing a pedestrian from an input image picked up by image pick-up means based on a pattern matching between the input image and model images of the pedestrian, comprising:

prospective pedestrian recognizing means for recognizing a whole-body region surrounding a whole-body model image and a prospective part region surrounding a part model image of the whole body from the input image based on a pattern matching using the whole-body model image and the part model image of the pedestrian; and pedestrian recognizing means for determining whether or not a recognized prospective part region is a part of the pedestrian if a prospective part region exists in the whole-body region recognized by the prospective pedestrian recognizing means, wherein the pedestrian recognizing means compares a preceding prospective part region recognized from a preceding input image with a prospective part region recognized from the current input image if the whole-body region has not been recognized by the prospective pedestrian recognizing means and, determines that the prospective part region recognized from the current input image is the part of the pedestrian if the distance between the both prospective part regions is equal to or smaller than a predetermined distance.

5. The pedestrian detection apparatus according to claim 4, wherein:
the part model image is the head model image.

6. The pedestrian detection apparatus according to claim 5, wherein:
the image pick-up means is one of the far-infrared camera and the infrared camera.

7. The pedestrian detection apparatus according to claim 5, wherein:
the image pick-up means is provided in at least one of the vehicle and the street.

8. The pedestrian detection apparatus according to claim 4, wherein:
the image pick-up means is one of the far-infrared camera and the infrared camera.

9. The pedestrian detection apparatus according to claim 4, wherein:
the image pick-up means is provided in at least one of the vehicle and the street.

10. A pedestrian detection apparatus, for recognizing a pedestrian from an input image picked up by image pick-up means based on a pattern matching between the input image and model images of the pedestrian, comprising:
prospective pedestrian recognizing means for recognizing a whole-body region surrounding a whole-body model image and a prospective part region surrounding a part model image of the whole body from the input image based on a pattern matching using the whole-body model image and the part model image of the pedestrian; and
pedestrian recognizing means for determining whether or not a recognized prospective part region is a part of the pedestrian if a prospective part region exists in the whole-body region recognized by the prospective pedestrian recognizing means, wherein:
the pedestrian recognizing means compares a preceding prospective part region recognized from a preceding input image with one or more prospective part regions recognized from the current input image if the whole-body region has not been recognized by the prospective pedestrian recognizing means, and determines the prospective part region being at the closest position to the preceding prospective part region and being within a predetermined distance among the recognized prospective part regions to be the part of the pedestrian.

11. The pedestrian detection apparatus according to claim 10, wherein:
the part model image is the head model image.

12. The pedestrian detection apparatus according to claim 11, wherein:
the image pick-up means is one of the far-infrared camera and the infrared camera.

13. The pedestrian detection apparatus according to claim 11, wherein:
the image pick-up means is provided in at least one of the vehicle and the street.

14. The pedestrian detection apparatus according to claim 10, wherein:
the image pick-up means is one of the far-infrared camera and the infrared camera.

15. The pedestrian detection apparatus according to claim 10, wherein:
the image pick-up means is provided in at least one of the vehicle and the street.

* * * * *